US008286898B2

(12) United States Patent
Muljono

(10) Patent No.: US 8,286,898 B2
(45) Date of Patent: Oct. 16, 2012

(54) ELECTROSTATIC SPRAY ASSEMBLY

(75) Inventor: Eric Budi Muljono, Amherts, NH (US)

(73) Assignee: Spraying Systems Co., Wheaton, IL (US)

( * ) Notice: Subject to any disclaimer, the term of this patent is extended or adjusted under 35 U.S.C. 154(b) by 687 days.

(21) Appl. No.: 12/092,291

(22) PCT Filed: Nov. 2, 2006
(Under 37 CFR 1.47)

(86) PCT No.: PCT/US2006/042879
§ 371 (c)(1),
(2), (4) Date: Sep. 17, 2009

(87) PCT Pub. No.: WO2007/056098
PCT Pub. Date: May 18, 2007

(65) Prior Publication Data
US 2010/0187337 A1  Jul. 29, 2010

Related U.S. Application Data

(60) Provisional application No. 60/733,289, filed on Nov. 3, 2005.

(51) Int. Cl.
*B05B 5/00* (2006.01)
(52) U.S. Cl. ............. 239/696; 239/690.1; 239/694; 239/548; 239/566; 137/862; 137/625.48

(58) Field of Classification Search .......... 137/625.48, 137/862, 863, 869; 239/3, 690–708, 566, 239/556, 548
See application file for complete search history.

(56) References Cited

U.S. PATENT DOCUMENTS

| | | | |
|---|---|---|---|
| 3,820,828 A * | 6/1974 | Fiddler | 285/124.3 |
| 5,052,617 A | 10/1991 | Colclough et al. | |
| 5,066,216 A * | 11/1991 | Kowtko et al. | 425/562 |
| 5,165,601 A | 11/1992 | Rodenberger et al. | |
| 5,332,154 A | 7/1994 | Marier et al. | |
| 6,435,428 B2 | 8/2002 | Kim et al. | |
| 2006/0081178 A1 * | 4/2006 | Willey et al. | 118/621 |

* cited by examiner

*Primary Examiner* — Jason Boeckmann
(74) *Attorney, Agent, or Firm* — Leydig, Voit & Mayer, Ltd

(57) ABSTRACT

An electrostatic spraying assembly including a housing and a plurality of elongated electrode elements supported within the housing each defining a respective fluid passageway. An electrode header connectable to a high voltage source is supported within the housing in spaced relation to the electrode elements for charging the electrodes to an electrical potential by induction, and in turn, charging liquid directed through the passageways. The electrode header and a resilient valve element supported thereon are movable between retracted and closing positions for controlling the flow of fluid through the electrode passageways for discharge into an electrical field generated by an induction element supported in spaced relation to the discharge ends of the electrode elements.

12 Claims, 2 Drawing Sheets

ELECTROSTATIC SPRAY ASSEMBLY

CROSS-REFERENCE TO RELATED PATENT APPLICATIONS

The present application claims the benefit of U.S. Provisional Patent Application No. 60/733,289 filed Nov. 3, 2005, and is a continuation-in-part of application Ser. No. 11/056,703 filed Feb. 11, 2005, which in turn claims the benefit of U.S. Provisional Patent Application No. 60/544,269 filed on Feb. 12, 2004, the disclosures of which are incorporated herein by reference.

FIELD OF THE INVENTION

The present invention relates generally to spray nozzle assemblies, and more particularly, to electrostatic spray nozzle assemblies that electrostatically charge fluids discharging from spray nozzles to facilitate liquid particle breakdown and distribution.

BACKGROUND OF THE INVENTION

Electrostatic spray nozzle assemblies are utilized for applying oil and other coating and lubricating fluids in various manufacturing processes. Electrostatic spray nozzle assemblies, such as shown in U.S. Pat. No. 4,749,125, discharge a plurality of fluid flow streams which are electrostatically charged and atomized by means of a high voltage electrode with the assistance of a grounded induction bar for disposition onto items to be sprayed or coated, typically as they are conveyed past the spraying apparatus.

Heretofore, such electrostatic assembly spray nozzle assemblies have suffered from various operating and maintenance problems. For example, imprecise manufacture and assembly of such spray nozzles and charging electrodes can result in high voltage leakage that can significantly affect the operating efficiency of the spray operation. Fluid leakage problems also can adversely affect the spray distribution and lead to waste of costly spray liquids. While it often is desirable to direct a plurality of electro-statically charged flow streams, heretofore it has been difficult to effectively and efficiently control the liquid discharge for cyclic operation and without undesirable dripping and waste of the coating fluid.

OBJECTS AND SUMMARY OF THE INVENTION

It is an object of the present invention to provide an electrostatic spray nozzle assembly that is adapted for more efficient and reliable spraying of oils and other lubricating and coating fluids.

Another object is to provide an electrostatic spray nozzle assembly which includes electrostatic charging electrodes that are adapted for more precise manufacture and mounting within the nozzle assembly, and hence more efficient operation with reduced power consumption and increased life expectancy.

A further object is to provide an electrostatic spray nozzle assembly of the foregoing type which is operable for electrostatically charging and controlling the spray discharge of a plurality of fluid flow streams for more uniform coating or lubricating of items that are sprayed.

Still another object is to provide an electrostatic spray nozzle assembly of the above kind that can be efficiently controlled for repeated cyclic operation without undesirable drippage during shut-off.

Another object is to provide an electrostatic spray nozzle assembly that has relatively large fluid passages that resist clogging and are easy to clean.

Yet a further object is to provide such an electrostatic spray nozzle assembly which is relative simple in construction and lends itself to economical manufacture.

Other objects and advantages of the invention will become apparent upon reading the following detailed description and upon reference to the drawings, in which:

Figure 1:
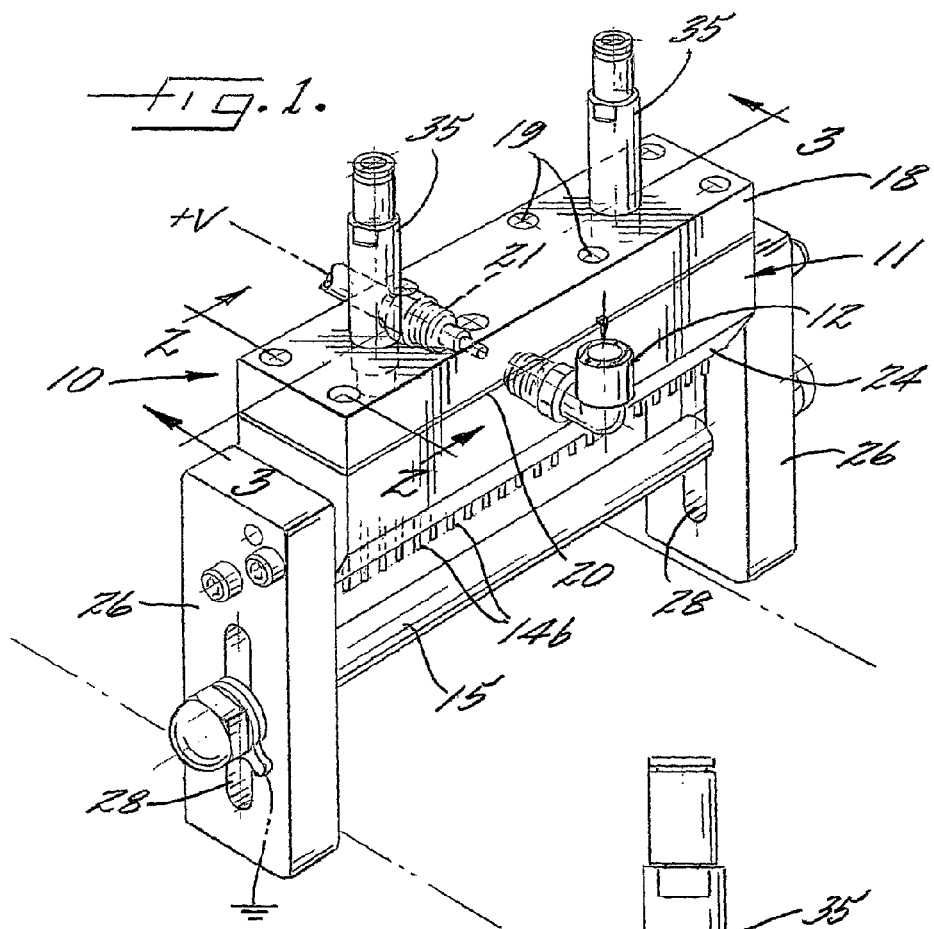
FIG. 1 is a perspective view of an illustrative spray nozzle assembly in accordance with the invention.
Figure 2:
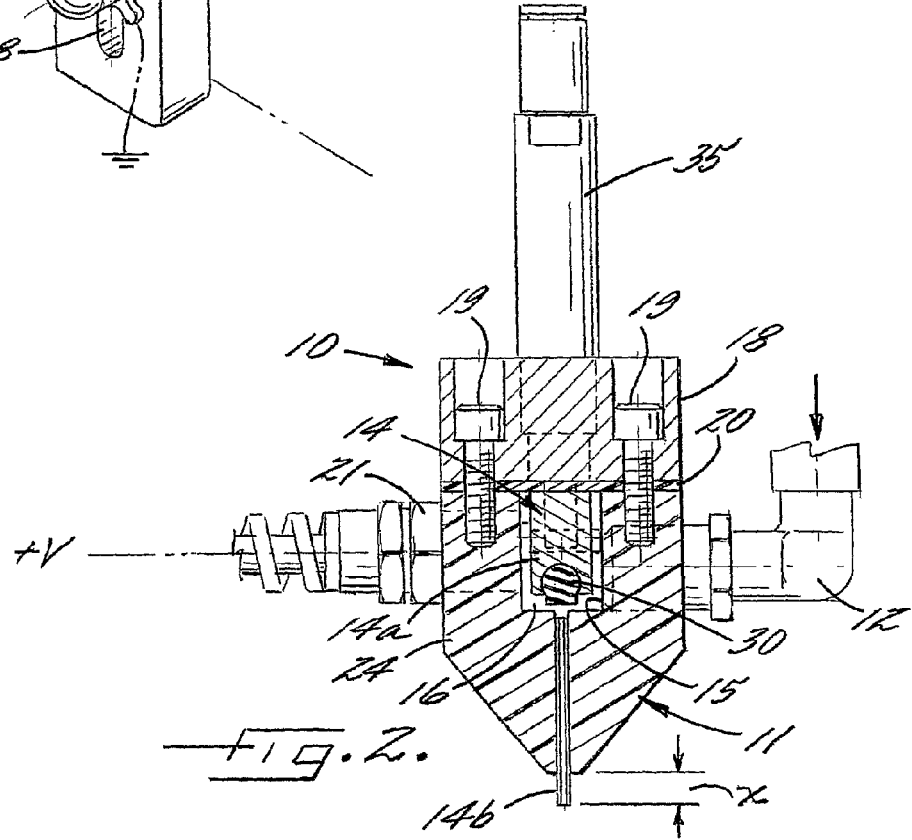
FIG. 2 is an enlarged vertical section of the illustrated spray nozzle assembly taken in the plane of line 2-2 in FIG. 1, showing the spray nozzle assembly in an operating condition.
Figure 3:
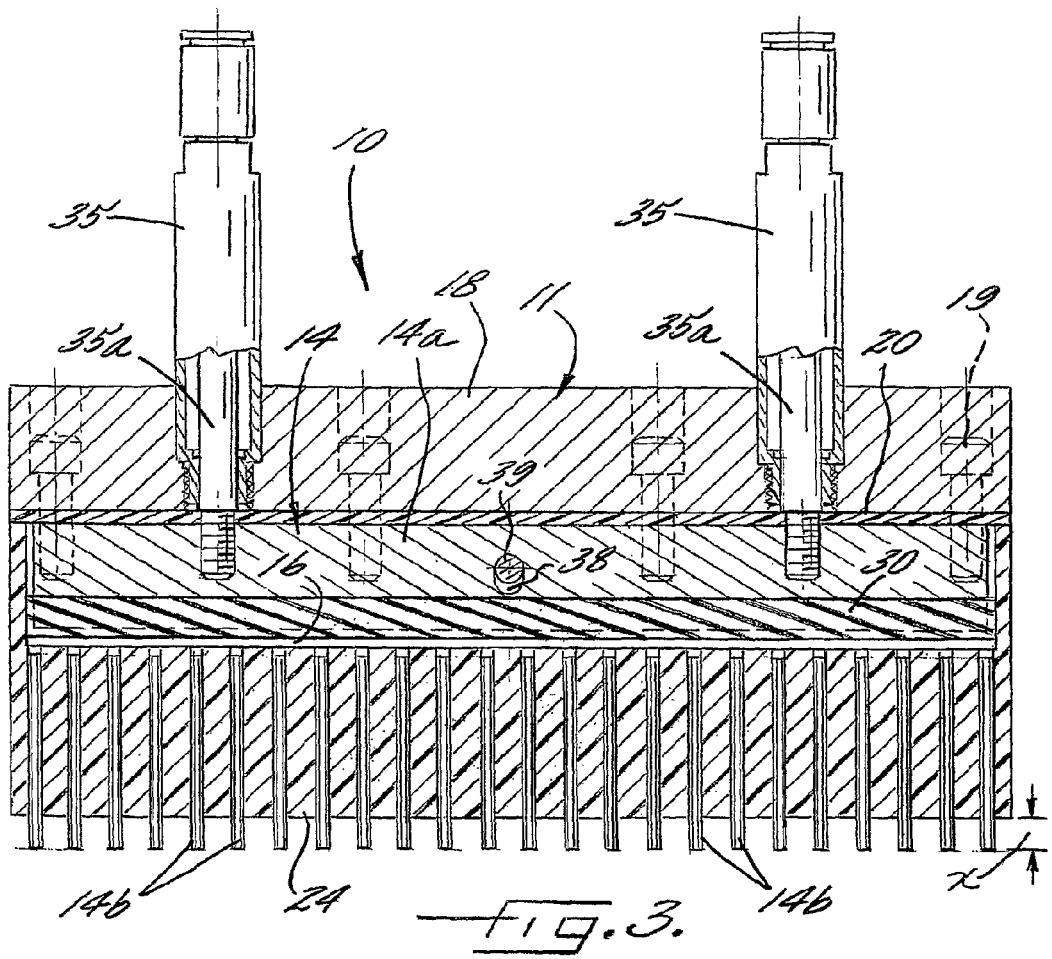
FIG. 3 is an enlarged longitudinal section, taken in the plane of line 3-3 in FIG. 1, again showing the spray nozzle assembly in an operating condition.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF PREFERRED EMBODIMENTS

Referring now more particularly to the drawings, there is shown in an illustrative electrostatic spray nozzle assembly 10 embodying the present invention, which is adapted for directing an elongated spray of oil or other lubricating or coating fluid on items conveyed below the spray assembly 10. The illustrative spray assembly 10 basically comprises a non-metallic elongated housing 11 having an inlet port connected to a fluid supply pipe 12 that supplies liquid coating or other fluid materials to the spray assembly 10, an electrode assembly 14 within the spray housing 11 for charging fluid passing through and directed from a lower discharge end of the housing 11, and an induction bar 15 disposed in parallel spaced relation to the discharge end of the housing 11 for generating an electrical field to enhance liquid particle breakdown. It will be appreciated that the housing 11 may be appropriately supported by support brackets or the like in overlying relation to items to be sprayed.

Figure 4:
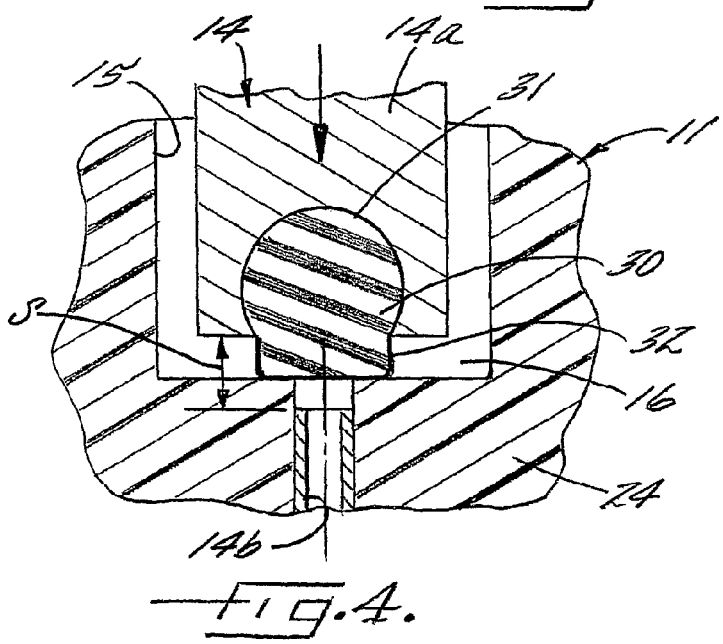
FIG. 4 is an enlarged fragmentary section, showing the spray nozzle assembly in a liquid shut-off condition.

In accordance with the invention, the electrode assembly comprises a metallic block or header and a plurality of elongated electrode elements disposed in alignment with respective fluid passageways communicating with the fluid inlet port of the housing for charging fluid as it passes along the length of the elongated electrode elements and is discharged from the spray assembly. To this end, in the illustrated embodiment, the electrode assembly 14 comprises an elongated metallic electrode block 14a disposed within a relatively larger sized channel 15 within the housing 11 and a plurality of elongated electrode elements 14b supported in a longitudinally spaced array in depending relation to the housing 11. The rectangular channel 15 of the housing in this case is sized larger than the electrode block 14a for defining an elongated generally U-shaped fluid flow passageway 16 (FIG. 4) communicating between the fluid inlet port and each of the elongated electrode elements 14b. For enclosing the upper end of the elongated channel 15, the housing 11 has a cover 18 which is secured to the upper end of the housing by appropriate fastening bolts 19 with a sealing gasket 20 interposed there between. The electrode block 14a is connected to an appropriate high voltage source, such as 20,000 volt source, by means of a conventional banana coupling 21 coupled to the electrode block 14a at a central location through a side wall of the housing 11. As will become apparent to a person skilled in the art, by reason of the high voltage charged electrode block 14a, the adjacent row of elongated electrode elements 14b will be charged by induction to a sufficiently high electrical potential for charging fluid as it passes along the length of the electrode elements 14b and is discharged from the spray assembly.

In carrying out the invention, the elongated electrode elements are in the form of elongated metallic tubes which each define a respective liquid flow passageway communicating between the internal housing fluid passageway 16 and simultaneously charge the liquid as it is passing through the electrode tubes 14*b*. As will be understood by a person skilled in the art, as the fluid passes through the electrode tubes 14*b*, it is charged such that when the fluid exits the tubes 14*b* and enters the electrical field between the terminal ends of the tubes 14*b* and the induction bar 15, fluid is dispersed in a fine particle spray. The use of the electrode tubes 14*b* also provide relatively large flow passages that are more resistant to clogging and are easier to clean.

The electrode tube receiving body of the housing 11 preferably has a one-piece block construction which facilitates precision concentric mounting of the electrode tubes 14*a* for preventing high voltage leakage. The illustrated housing 11 includes a one-piece body 24, preferably machined from plastic stock, with electrode tube receiving openings being drilled in the body and the longitudinal channel 15 being milled. It will be understood that by virtue of such one-piece housing body construction, there are no parting planes associated with the liquid flow passageways 16 typical of multi-part housings, nor fasteners for retaining a multi-part housing body in assembled condition at such parting planes.

The electrode tubes 14*a* preferably each protrude outwardly of the discharge end of the housing 11 a predetermined distance "x," such as about ¼ inch (see FIG. 2). It has unexpectedly been found that the protruding electrode tubes maximize liquid flow rate through the spray nozzle assembly. Although the theory of operation is not entirely understood, it is believed that the greater surface area of tubes over which the liquid travels facilitates liquid flow and discharge from the spray nozzle assembly. The increased contact with the electrode tubes further enhances charging of the liquid and ultimate atomization. The housing 11 in this case is formed with a generally tapered depending end through which the electrode tubes 14*b* protrude for further preventing the effect of possible surface tension on the liquid as it discharges from the housing.

To enhance safety, the electrode tubes 14*b* preferably are arranged such that each tube terminates a small distance S (FIG. 4) from the electrode block or header 14*a* which in this case places the upper ends of the tubes 14*b* in slightly recessed relation the upper perimeter of the housing bores within which the tubes are mounted. With this arrangement, the electrode tubes 14*b* will not be charged at such high electrical potential that could pose a safety hazard. Instead, the electrode tubes 14*b* are charged inductively due to their proximity to the electrode header 14*a*. The inductive charging of the electrode tubes 14*b* will provide sufficient charging to provide the desired level of added charge to the fluid passing through the tubes 14*b*. Accordingly, safety of the spray operation is increased without significant degradation in spray performance.

The induction bar 15 in this case is mounted for selective positioning relative to the downstream ends of the electrode tubes 14*b* for maximizing the effect of the electrical field therebetween on the discharging liquid, and hence, maximizing liquid particle breakdown. As shown in FIG. 1, the induction bar 15, is supported by elongated arms 26 fixed in depending angled relation to opposite ends of the housing 11. The induction rod 15 is selectively positionable within elongated slots 28 formed in the supporting arms 26 for effecting the desired spray characteristics.

In operation of the spray assembly 10, it will be seen that oil or other lubricating or coating fluid may be supplied through the liquid supply pipe 12 into communication with the longitudinal flow channel 16 and through the plurality of longitudinally spaced depending electrode tubes 14*b*, being charged along their entire length of travel. Upon discharge from the electrode tubes into electrical field 23 between the electrode tubes 14*b* and the induction ban 5, the liquid is dispersed into a fine particle spray with the repelling charges of the particles effecting substantially uniform distribution onto items to be coated positioned as passing below the spray assembly 10.

In carrying out a further important aspect of the invention, the spray nozzle assembly 10 is adapted for efficient cyclic operation without undesirable dripping or wastage of liquid. To this end, the underside of the electrode block 14*a* is provided with a valve element in the form of an elongated sealing gasket 30 and the electrode block 14*b* is moveable between a raised operating position that permits the flow of fluid through the housing and to each of the electrode tubes 14*b*, as depicted in FIGS. 2 and 3, and a lowered closed position in which the elongated sealing gasket 30 simultaneously closes the inlets to each of the electrode tubes 14*b* as depicted in FIG. 4. The sealing gasket 30 in this case has a generally cylindrical upper portion 31 which is press fit within to a complimentary recess in the underside of the electrode block 14*a* and a lower generally rectangular portion 32 that defines a flat sealing surface for contacting the flat bottom of the housing channel in overlying relation to the cylindcrical bores that communicates with electrode tubes 14*b*. For raising and lowering the electrode block 14*a* and sealing gasket 30 between such operating and closed positions, a pair of air cylinders 35 are mounted in the upper end of the housing cover 18 which each have a respective cylinder rod 35*a* threadedly fixed to the electrode block 14*a*. The cylinders may be of a known spring return type, such that upon pressurized air actuation the piston and rod thereof are raised against the biasing force of the return spring and upon deactuation of the pressurized air supply, the cylinder return springs force the piston rods 35*a*, electrode block 14*a*, and gasket 30 to the lowered position simultaneously interrupting the communication of fluid to the electrode tubes 14*b*.

In carrying out the invention, to permit such raising and lowering of the electrode block 14*a* within the housing channel 15 while maintaining the electrode block in conductive relation to the banana coupling 21, the electrode block 14*a* is formed with an elongated slot 38, which receives a conductive rod 39 of the banana coupling 21 (FIG. 3). The slot 38 has a vertical length sufficient to permit movement relative to the conductive rod 39 during raising and lowering movement of the electrode block 14*a* and a width corresponding substantially to the width of the rod 39 for maintaining electrical contact with the conductive rod 39.

It has been found that by virtue of the simultaneous opening and shutting of the electrode tubes to the supply of fluid at locations adjacent their inlet ends, the spray nozzle assembly 10 can be efficiently operated with reliable drip-free termination of spraying. The air cylinders further permit easy control and reliable operation. Yet the spray nozzle assembly 10 is relatively simple in construction and lends itself to economical manufacture.

The invention claimed:

1. An electrostatic spraying assembly comprising;

a housing;

a plurality of an elongated electrode elements supported in said housing;

said housing having a fluid inlet passage that is connectable to a fluid source and a fluid passage communicating between said fluid inlet and said electrode elements;

said electrode elements each having a fluid passageway with an upstream inlet end communicating with said housing fluid passage and an outlet end through which fluid can be discharged;

an electrically charged electrode header within said housing connected to a voltage source for electrically-charging said electrode elements and fluid passing through said electrode element passageways;

said electrode header being movable between a retracted position that permits passage of fluid through said housing passage and said electrode elements fluid passageways during which time said fluid is electrically charged and a closing position that prevents passage of fluid through said electrode element discharge passageways;

a coupling element for connecting said electrode header to said voltage source;

said electrode header being movable relative to said coupling element during movement between said retracted and closing positions;

said electrode header having an elongated slot within which said coupling element is positioned in electrical contact with said header; and said coupling element being slidable within said slot during movement of said header between said retracted and closing positions for maintaining electrical contact with the electrode header.

2. The electrostatic spraying system of claim 1 in which said electrode header is disposed within said housing in spaced relation to the upstream inlet ends of said electrode elements for charging said electrodes to an electrical potential by induction.

3. The electrode spraying assembly of claim 1 in which each said electrode element is mounted within a respective passageway in said housing, and said upstream inlet end of each electrode elements being disposed in recessed relation below an upstream end of the respective housing passageway.

4. The electrostatic spraying system of claim 1 in which said housing includes a one-piece plastic body formed with a chamber for receiving the electrode header, and a cover positionable in sealed relation onto said body enclosing said chamber.

5. The electrostatic spraying assembly of claim 1 in which said electrode elements are arranged in a row, and said electrode header has an elongated configuration for simultaneously preventing passage of liquid through the discharge passageways of said electrode elements when in said closing position.

6. The electrostatic spraying assembly of claim 1 in which said electrode header has a sealing member mounted therein, and said electrode header and sealing member are movable between said retracted and closing positions.

7. The electrostatic spraying system of claim 6 in which said sealing member has a generally cylindrical mounting end disposed within a complementary recess in an underside of said electrode header and a lower generally rectangular portion that defines a sealing surface for closing the inlet ends of said electrode elements when in a closing position.

8. The electrostatic spraying system of claim 5 including at least one cylinder for cyclically raising and lowering said electrode header and sealing member between said open and closed positions.

9. The electrostatic spraying system of claim 1 in which electrode header is arranged within said housing liquid passage.

10. The electrostatic spraying system of claim 1 in which the outlet ends of said electrode elements protrude a predetermined distance outwardly of said housing.

11. The electrostatic spraying system of claim 1 in which said housing is formed with a tapered discharge end from which the outlet ends of said electrode elements protrude.

12. The electrostatic spraying system of claim 1 further including an induction element supported in spaced relation to the outlet ends of said electrode elements for generating an electrical field between the discharge ends of said electrode elements and said induction element into which discharging fluid is dispersed.

* * * * *